July 21, 1936.  A. F. SCHUMANN  2,048,299

MELTING KETTLE FOR TAR, ASPHALT AND THE LIKE

Filed Oct. 3, 1933  2 Sheets-Sheet 1

INVENTOR
ALFRED F. SCHUMANN
BY
ATTORNEY

July 21, 1936.　　A. F. SCHUMANN　　2,048,299

MELTING KETTLE FOR TAR, ASPHALT AND THE LIKE

Filed Oct. 3, 1933　　2 Sheets-Sheet 2

INVENTOR
ALFRED F. SCHUMANN
BY
ATTORNEY

Patented July 21, 1936

2,048,299

UNITED STATES PATENT OFFICE 2,048,299

MELTING KETTLE FOR TAR, ASPHALT, AND THE LIKE

Alfred F. Schumann, Baltimore, Md., assignor to Hauck Manufacturing Company, Brooklyn, N. Y., a corporation of New York Application October 3, 1933, Serial No. 691,978

5 Claims. (Cl. 126—343.5)

The invention relates to melting apparatus, more particularly to melting kettles for tar, asphalt and the like, and such as are designed usually for highway maintenance, paving, roofing and waterproofing operations.

It has for an object the provision of a kettle of this type which may be operated at high efficiency and wherein the material may be more rapidly and effectively heated and melted than in kettles as ordinarily constructed; also, to so construct a kettle that coking due generally to overheating of the kettle bottom is eliminated and accumulation of foreign matter thereon obviated, thereby affording a kettle giving longer and more uniform service.

A further object of the invention resides in the provision of a melting kettle which is readily cleaned of dirt, residue and other foreign matter collecting therein.

Still another object of the invention is to construct the kettle in such a manner that withdrawal of molten material in starting operations may be accomplished prior to a complete melting of all of the material within the kettle; and also in shutting down of the melting operation to enable substantially complete draining of the molten material from the kettle.

In carrying out the invention, a suitably shaped receptacle or kettle is provided with an opening in the top to receive material to be melted; and there is retained therein a heating flue which is mounted within its lower portion and preferably spaced from the bottom of said receptacle. Provision is made for introducing into the flue at one end a suitable heating medium which is discharged from its opposite end, preferably through a suitable upwardly extending stack projecting through the top of the kettle.

The material to be melted is supported by the flue and auxiliary members in such a manner that, when the kettle is in operation, the flue as a whole becomes substantially immersed in molten material. The flue, also, is inclined to the vertical to direct molten material and any foreign matter toward the bottom of the kettle.

A suitable outlet pipe is provided for withdrawing the molten material from the lower portion of the kettle, the inlet opening of the pipe being located somewhat above the bottom of the kettle, while a drain opening is provided substantially at the lowermost portion of the outlet pipe for discharging any remaining molten material from the bottom of the receptacle as in draining the kettle.

The nature of the invention, however, will best be understood when described in connection with the accompanying drawings, in which.

Figure 1:
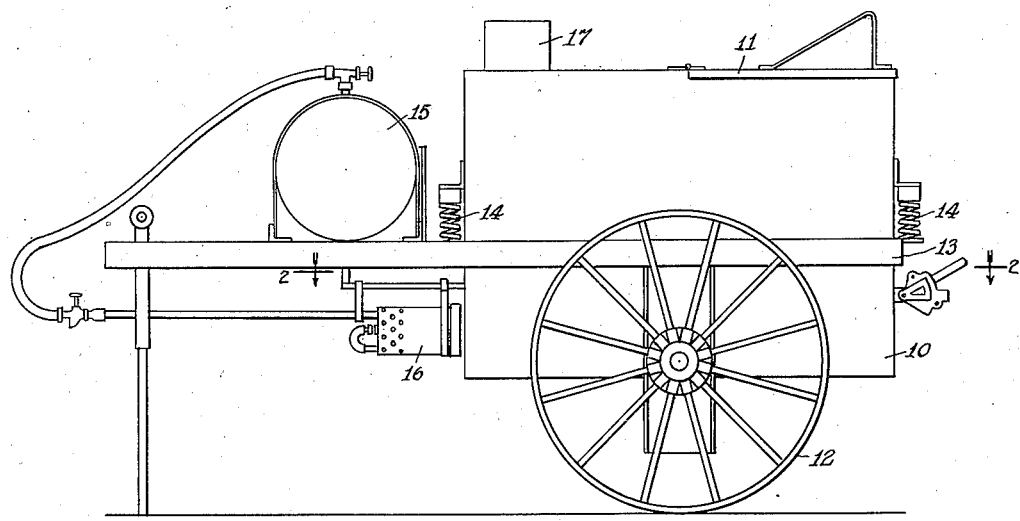
Fig. 1 is a side elevation of the novel melting apparatus.
Figure 2:
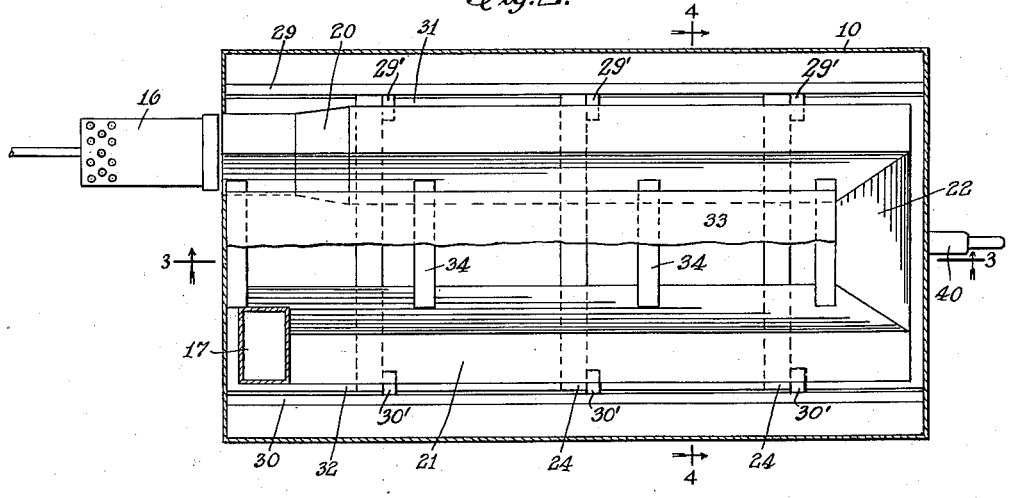
Fig. 2 is a horizontal section, on an enlarged scale, of the kettle member with a portion of the central baffle plate removed.
Figure 3:
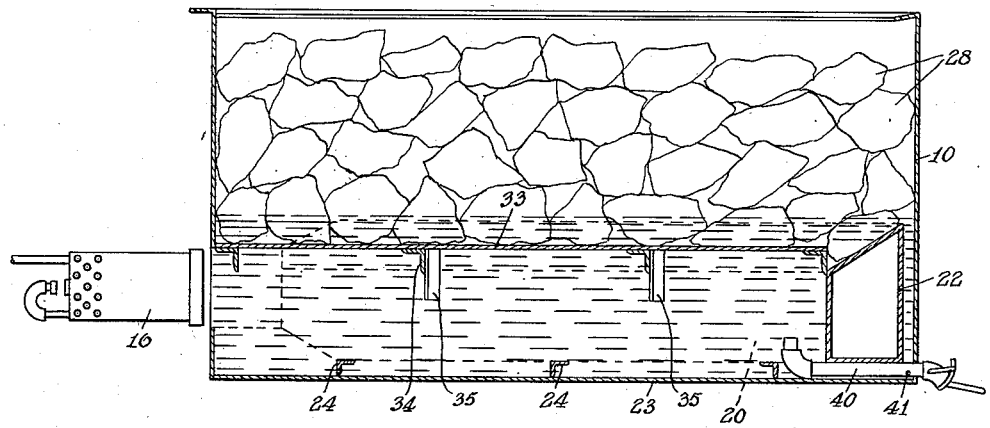
Fig. 3 is a vertical longitudinal section of a loaded kettle member with the top removed, and taken on the line 3—3, Fig. 2 of the drawings, looking in the direction of the arrows.

Referring to the drawings, 10 designates a metal shell or more or less elongated receptacle provided with an opening at the top but which may be closed by means of a hinged lid 11, for example after filling the receptacle with material to be melted. The receptacle, for convenient transportation, may be mounted upon wheels 12 through a chassis 13 upon which the receptacle is cradled, for example, by helical springs 14, the chassis carrying also a fuel tank 15 and a flame burner 16 connected thereto.

In accordance with the invention, the burner 16 is designed to project a flame, not directly beneath a kettle or receptacle as is the usual practice, but into a flue member located in the lowermost portion of the kettle 10 and having the discharge chimney 17 projecting through the top of the kettle. The flue is shown as a U-shaped tubular element of more or less rectangular cross-section comprising the arms 20 and 21 and the connecting end 22. This U-shaped element is horizontally disposed within the receptacle and is arranged to be spaced from the side walls of the receptacle and, preferably, also from the bottom wall 23 thereof, for example, through spaced angle bars 24. Thus, any molten material collecting in the bottom of the receptacle will eventually entirely surround the flue and be maintained thereby at the required temperature to provide the material in the desired liquid condition for dispensing from the kettle.

Figure 4:
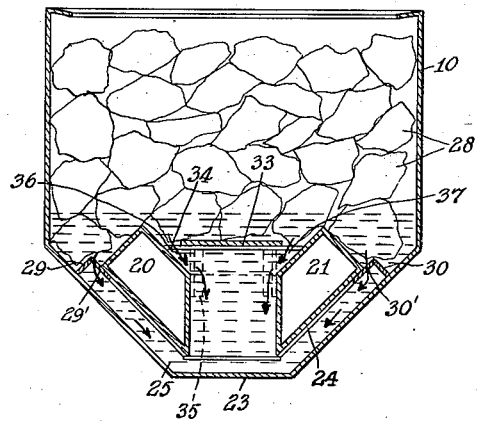
Fig. 4 is a similar vertical transverse section taken on the line 4—4, Fig. 2 of the drawings, and looking in the direction of the arrows.

The bottom of the receptacle 10 is preferably tapered, as shown in Fig. 4, to afford a tapered trough 25.

The two arms 20 and 21 and the connecting end 22 of the flue are tilted or inclined to the vertical, say to an angle of 45°, to substantially parallel the corresponding side walls of the trough. This affords a hopper-like space within the receptacle for receiving the material 28 to be melted, which is usually provided in the form of more or less large chunks, and for directing the molten material as well as any foreign matter to the bottom of the receptacle. Provision is also made for preventing the unmelted material or chunks from entering the spaces between the outer side walls of the flue arms and the side walls of the trough. Thus, longitudinally extending plates 29 and 30 may be located along the corresponding side walls of the trough, resting upon the projecting ends of the angle bars 24 and having downwardly extending fingers 29' and 30', respectively, which are adapted to contact the walls of the corresponding flue arms to obviate rocking of a plate out of position.

The plates may also be lifted bodily out of position to admit of access to the intervening space for cleaning, if necessary. These bars, moreover, are arranged, preferably, to be located at a point below the highest portion of a corresponding flue arm, and leave elongated slots 31 and 32 at the opposite sides of the trough through which molten material may flow into the bottom of the trough as the chunks of material melt down under the heat conveyed through the flue, as indicated by the arrows.

Means are also provided in the space between the two arms of the flue to prevent the unmelted material or smaller chunks from extending too far therein toward the bottom of the receptacle. To this end, a longitudinal plate 33 is positioned between the arms 20, 21 and is carried upon transversely spaced angle bars 34 whose ends rest against the corresponding side walls of the flue arms; and to obviate rocking and shifting of the plate from its horizontal position, longitudinally disposed angle bars 35 may be secured to a number of the bars 34 to extend downwardly therefrom as guides engaging with the said side walls of the respective arms.

The width of plate 33 is such, however, as to leave longitudinal slots or passages 36 and 37 between its side edges of the corresponding surfaces of the adjacent flue arms, molten material passing therethrough into the space between the arms and to the bottom of the trough as indicated by the arrows.

By this expedient, it will be observed that the material to be melted and molten material may be caused to entirely surround the heating flue, a portion thereof above the flue floating for a time in solid state until finally melted.

In charging the kettle, the solid material will be located above and supported by the flue and the auxiliary parts or plates 29, 30 and 33, while the material as it becomes molten will be directed by the flue and its auxiliary parts, and gravitates to the bottom of the trough, where it will be maintained at a sufficiently elevated temperature to retain it in the desired fluid condition for discharge.

This discharge may be effected conveniently through an outlet pipe 40 extending upwardly into the space between the arms of the flue so as to have an opening appreciably above the bottom of the receptacle. This will allow for withdrawal of molten material, in starting the kettle, before all of the material has melted to the bottom of the receptacle. The pipe 40 may also be provided with a drain outlet 41 at its lowermost portion to drain substantially the kettle of any retained melt upon shutting down of the apparatus. In order quickly to melt any residue within the pipe 40 upon starting operations, the pipe has been arranged to contact with a wall of the connecting end 22 of the heating flue.

To clean the receptacle of any dirt, residue or other foreign matter which may have collected therein, the plates 29, 30 and 33 may readily be lifted out with the accumulated matter and then replaced after freeing the same thereof; and at the same time access is had to the bottom of the receptacle for removal of any foreign matter which may have accumulated thereon. It will be understood also that for the openings 31, 32 and 36, 37 afforded by the respective screening plates perforated plates may be substituted and that the openings in either case are to be of a width somewhat less than the diameter of the inlet opening of the discharge pipe 40 so as to prevent any lumps of material passing the heating element and tending to clog the said discharge pipe 40.

I claim:

1. A melting kettle for tar, asphalt and the like, comprising a receptacle provided with an opening at the top to receive material to be melted, a heating flue of U-shape mounted within the lower portion of the receptacle and spaced from its walls, means to introduce a heating medium into one end of the flue, said flue being provided with a discharge outlet at its opposite end, a horizontally disposed baffle removably positioned longitudinally between the two arms of the U-shaped flue and spaced along its lateral edges from the corresponding surfaces thereof to afford passageways permitting molten material to pass therethrough to the bottom of the receptacle, and plates removably positioned longitudinally of the receptacle adjacent its sides and along the surfaces of the corresponding arms of the flues and spaced therefrom to afford passageways for permitting molten material to pass therethrough to the bottom of the receptacle.

2. A melting kettle for tar, asphalt and the like, comprising a receptacle provided with an opening at the top to receive material to be melted and tapered at its lower portion to form a trough, a heating flue of U-shape mounted within the trough, the legs of the flue extending longitudinally of the trough and the walls of the former being spaced from the walls of the latter, said legs being of elongated cross-section and inclined to the vertical, means to introduce a heating medium into one end of the flue, said flue being provided with a discharge outlet at its opposite end, a horizontally disposed baffle removably positioned longitudinally between the two arms of the U-shaped flue and spaced along its lateral edges from the corresponding surfaces thereof to afford passageways permitting molten material to pass therethrough to the bottom of the trough, and plates removably positioned longitudinally of the trough adjacent its sides and along the surfaces of the corresponding arms of the flues and spaced therefrom to afford passageways for permitting molten material to pass therethrough to the bottom of the trough.

3. A melting kettle for tar, asphalt and the like, comprising a receptacle provided with an opening at the top to receive material to be melted, a heating flue of U-shape mounted within the lower portion of the receptacle and spaced from its walls, means to introduce a heating medium into one end of the flue, said flue being provided with a discharge outlet at its opposite end, and an outlet pipe located substantially at the base of the U-shaped flue, extending into the receptacle and provided with an opening between the arms of the flue and above the plane of its lowermost wall.

4. A melting kettle for tar, asphalt and the like, comprising a receptacle provided with an opening at the top to receive material to be melted, a heating flue of U-shape mounted within the lower portion of the receptacle and spaced from its walls, means to introduce a heating medium into one end of the flue, said flue being provided with a discharge outlet at its opposite end, and an outlet pipe located substantially at the base of the U-shaped flue, extending into the receptacle and provided with an opening between the arms of the flue and at its lowest point with a drain opening into the bottom of the receptacle.

5. A melting kettle for tar, asphalt and the like, comprising a receptacle provided with an opening at the top to receive material to be melted and tapered at the lower portion to form a trough, a U-shaped heating flue mounted within the trough, of trapezoidal cross-section with base wall substantially parallel to the tapered portion of the trough and the inner side wall substantially perpendicular to the base of the trough, the outer side wall being substantially perpendicular to the said tapered portion of the trough while the top is parallel to the base of the trough to afford a tapered opening for receiving the material to be melted, and means to introduce a heating medium into the one end of the flue, said flue being provided with a discharge outlet at its opposite end.

ALFRED F. SCHUMANN.